United States Patent [19]

Simbal

[11] Patent Number: 4,688,911
[45] Date of Patent: Aug. 25, 1987

[54] IMAGE MASK FOR MICROFICHE

[75] Inventor: John J. Simbal, St. Paul, Minn.

[73] Assignee: Minnesota Mining and Manufacturing Company, St. Paul, Minn.

[21] Appl. No.: 892,244

[22] Filed: Jul. 31, 1986

[51] Int. Cl.⁴ .............................................. G03B 21/14
[52] U.S. Cl. .......................................... 353/97; 353/88
[58] Field of Search ........................ 353/97, 42, 44, 87, 353/88, 120, 122, 121, 27 R, 27 A, 85; 355/125–126, 71, 74

[56] References Cited

U.S. PATENT DOCUMENTS

| | | | |
|---|---|---|---|
| 3,269,261 | 8/1966 | Porter | 353/DIG. 5 |
| 3,342,101 | 9/1967 | Zollner | 353/DIG. 5 |
| 3,531,193 | 9/1970 | Diehl | 353/97 X |
| 3,661,449 | 5/1972 | Wright | 353/88 |

Primary Examiner—Harry N. Haroian
Attorney, Agent, or Firm—Donald M. Sell; James A. Smith; John C. Barnes

[57] ABSTRACT

An image masking device for a microfilm reader and/or reader-printer is formed to slide longitudinally of a microfiche handler and comprises a thin opaque mask adapted to ride on the film handler adjacent a film to cover the film and define a clear line of demarcation between visible image portions and obscured portions.

5 Claims, 5 Drawing Figures

IMAGE MASK FOR MICROFICHE

BACKGROUND OF THE INVENTION

1. Field of the Invention

This invention relates to an apparatus for masking a projected image and in one aspect to a novel image masking device for use with microfilm projectors to allow the operator to selectively obscure a portion of the image projected from a microfilm.

2. Description of the Prior Art

Masking projected images is known to restrict a reader from reading ahead of the material being discussed during presentations using overhead projectors. Such a masking device is illustrated in U.S. Pat. No 3,269,261. This Patent discloses a mask 29 which is slideable with a respect to a frame placed over the projection window of an overhead projector stage.

Microfiche readers and the microfiche reader printers have been known and used in the microfilm arts for reading information from a microfilm for years. The material projected was always an image from a frame on the microfilm presenting one document. The conventional microfiche readers are disclosed in such patents as U.S. Pat. No. 4,025,177, and U.S. Pat. No. 3,616,737.

The purpose of the present invention is to allow the user of a microfilm reader or reader printer to mask unwanted information from a document by placing a mask in the area between the film plane and the projection lens to permit selective projection and printing of only certain information found on the frame of microfilm.

Present Invention adds to readers or reader printers for microfiche the capability of selecting the information to be viewed and to obscure irrelevant or confidential information from a document, as an example, a credit record from client A may be read and/or printed while credit records of clients B and C on the same frame of microfilm may be omitted.

The image masking device of the present invention is positioned to be operated by movement of a frame which rides on the upper support glass for a microfiche handler and includes a thin mask which is disposed in the film plane area between the two plates supporting the film to form a sharp demarcation between visible and obscured portions of an image on the microfiche.

SUMMARY OF THE INVENTION

The image masking device of the present invention comprises a frame made of plastic or metal having at least one handle affording facile movement of the frame along the upper glass of a microfiche handler. Supported on the frame and disposed on the under or inner surface between the glass plates on the microfiche handler is a thin strip of material having a length sufficient to extend across the frame and the film disposed in the film handler. The frame is formed to dispose the microfiche upper glass between the sides of the frame with a portion disposed along the edges and at or beneath the surface of the glass for supporting the thin flat mask. A small upper surface at each side of the frame rides on the upper surface of the upper fiche glass.

The frame comprises a generally U-shaped member with a long bar or bight portion and offset terminal end portions on the legs thereof. The thin flat mask is secured to the under portions of the offset terminal ends of the frame and extends in a direction parallel to the bight portion of the frame. A pair of handles are formed on the frame with one disposed at each corner of the frame for ease in moving the mask by the right or left hand. Beneath the frame is a small land or glide surface on each of the legs thereof which is disposed from said offset terminal end portions to ride on the upper surface of the upper fiche glass. The frame is preferably formed of a plastic because it is light in weight and has some natural lubricity.

DESCRIPTION OF THE DRAWING

The present invention will be further described with reference to the accompanying drawing wherein.

DETAILED DESCRIPTION OF THE INVENTION

Figure 1:
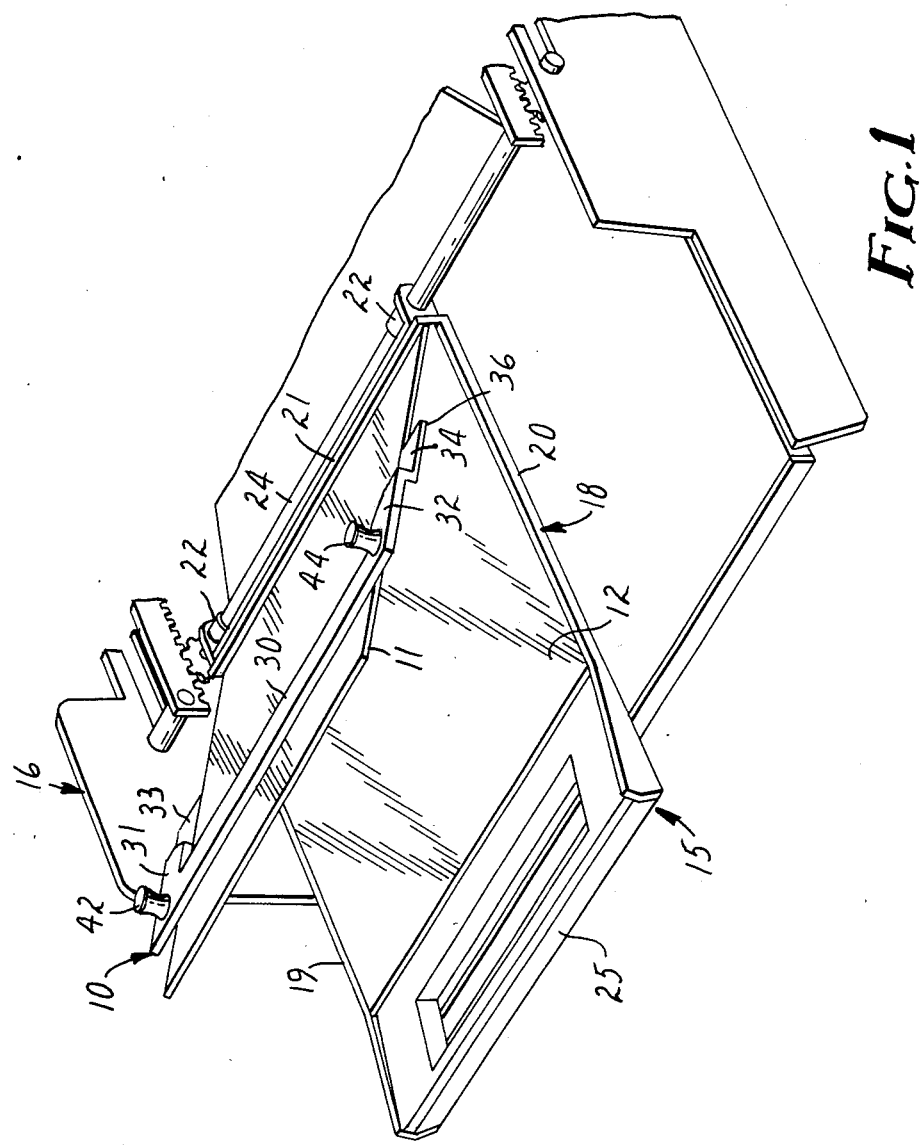
FIG. 1 is a detailed view of a film handler for a microfiche reader or reader printer having the image masking device of the present invention supported thereon.

This invention relates to an image masking device generally designated 10 which is adapted to fit on the upper glass 11 of a microfiche handler generally designated 15 supported by the frame 16 of a microfiche reader or reader printer.

The microfiche handler comprises a generally rectangular frame 18 including transversely disposed sidewalls 19 and 20. A rear wall 21 supports a pair of journal members 22 which support the frame 18 for transverse sliding movement on a rod 24. At the front of the frame 18 is a handle member 25 affording an operator to grasp the handler and slide the same laterally or to move the same longitudinally with respect to a projection lens disposed in the reader or reader printer. The upper glass 11 of the film handler is pivotal to allow insertion and removal of a frame of microfilm 13 between this upper glass 11 and a second lower planar glass 12. The image masking device of the present invention is adapted to fit onto the upper glass 11 and rides thereon in a longitudinal direction forward and back with respect to this upper glass 11.

Figure 2:
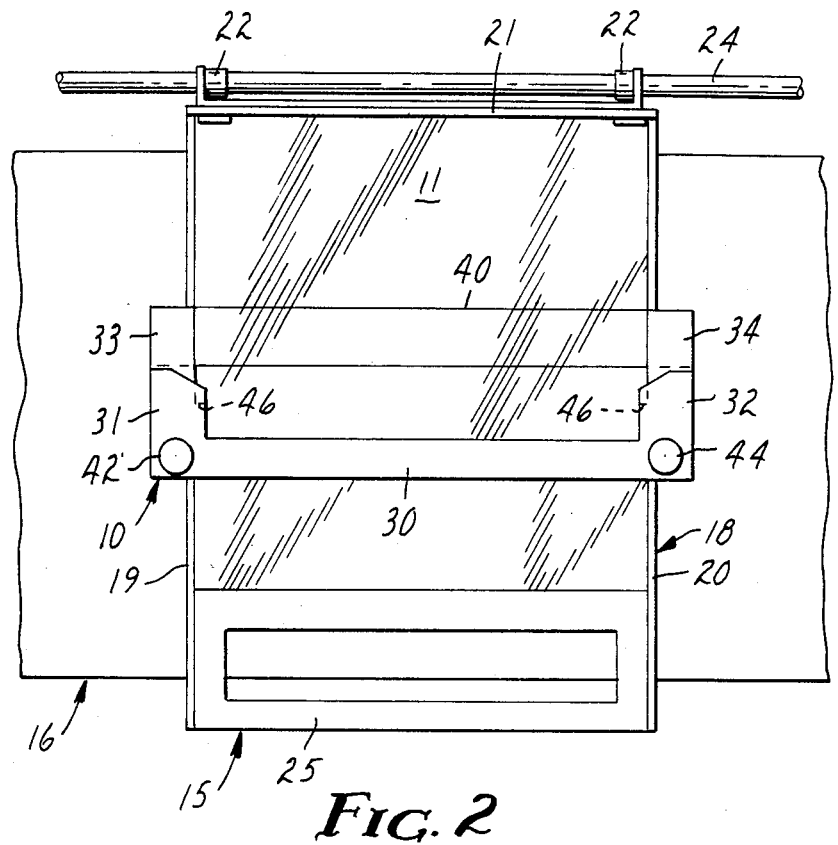
FIG. 2 is a plan view of the film handler and the image masking device of the present invention.
Figure 3:
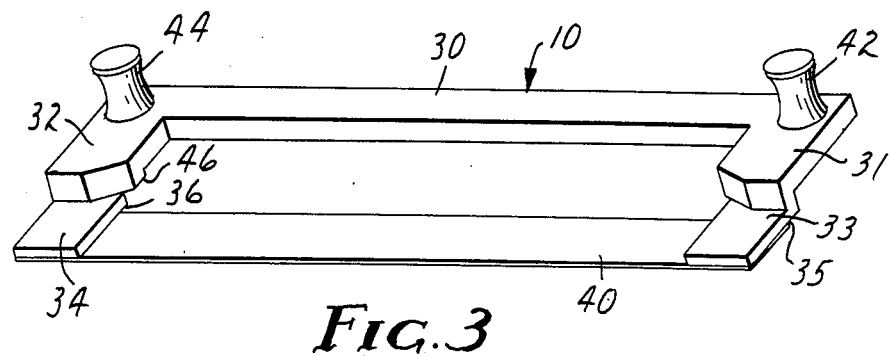
FIG. 3 is a perspective view of the image masking device.
Figure 4:
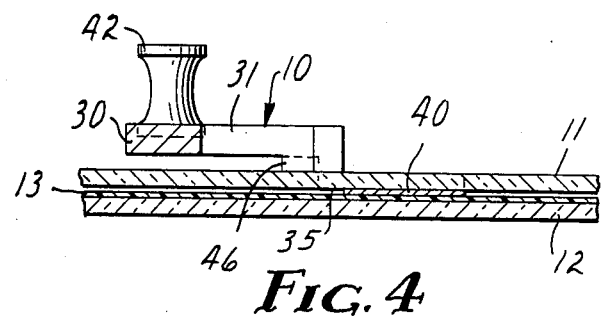
FIG. 4 is a fragmentary sectional view of the microfiche handler and a transverse sectional view of the masking device.
Figure 5:
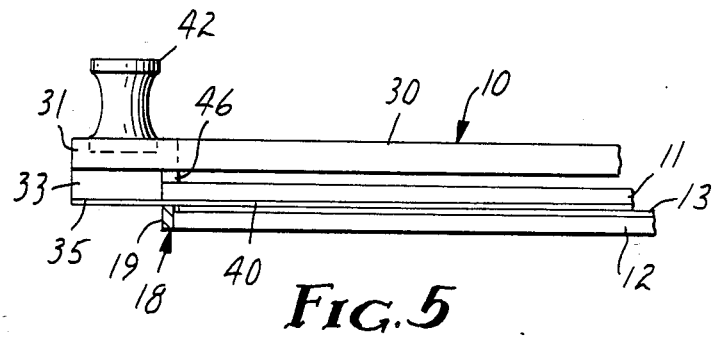
FIG. 5 is a fragmentary elevational view of the image masker and film handler.

As shown in FIG. 2 the masking device 10 comprises a generally "U" shaped frame having a wide bar defining the bight portion 30 and perpendicularly positioned leg portions 31 and 32 having terminal offset free end portions 33 and 34 respectively. By offset, the applicant means the terminal portions 33 and 34 are disposed in a plane offset and different than that of the leg portions 31 and 32 to dispose their lower most surfaces 35 and 36 respectively at a position substantially lower than the lower surfaces of leg portions 31 and 32. The terminal end members 33 and 34 are also slightly narrower than the remainder of the leg portions 31 and 32 with the opposed inner edges spaced farther than the inner edges of the leg portion to position the same along the longitudinal edges of the upper fiche glass 11 and to dispose a portion of the leg portions above the longitudinal edges of the upper glass 11.

The surfaces 35 and 36 are disposed at or slightly below the plane of the inner surface of the upper glass 11 and a long narrow mask 40 is attached to the surfaces 35 and 36 and extends across the inside surface of the upper glass 11 parallel to the bight portion 30. The mask 40 is formed of a thin ribbon of opaque material such as 0.002 inch stainless steel. Other opaque thin films of polymeric material could also be used. The mask 40 is thin such that when in contact, or near contact, with the microfiche at the projection aperture a very sharp demarcation exists between the portion of the image projected and the portions obscured.

The leg portions 31 and 32, together with the bight portion 30 are disposed on the opposite outer surface of upper glass 11. The mask device is provided with handles 42 and 44, one disposed at each end of the bight portion, to permit movement of the member longitudinally of the upper glass 11. These handles afford ready placement of the mask 40 over a portion of the image on the microfilm to be projected.

The leg portions 31 and 32 are preferably positioned above the top of the upper glass 11. A small projection 46 is formed below the leg portions 31 and 32 which projections have a surface to contact and ride on the top of the glass 11 and serve as glides for the frame. Preferably, the spacing between the lower surface of the glides 46 and the top surface of the mask 40 is equal to the thickness of the upper glass of the microfiche handler, which typically is 6 inches wide, about 5 inches long and ⅛ inch thick.

In operation, the image masking device 10 is placed on the upper glass of the fiche handler. It can move with the fiche handler during the positioning of a selected frame on the film at the projection aperture of the microfilm reader or reader printer. The mask device 10 may then be moved to obscure the desired portion of the projected image by covering that portion of the real image at the image plane.

The frame of the image mask device is preferably formed of plastic material because such material is light and has some inherent lubricity to afford ease of movement in relationship to the glass upon which it rides.

Having thus described the invention with reference to a drawing illustrating a preferred embodiment, it is understood that changes may be made without departing from the scope or spirit of the invention as defined in the appended claims.

I claim:

1. An image masking device for a microfiche reader and reader-printer for masking a portion of an image projected, said device comprising:
   a frame, said frame comprising a bar adapted to extend across a microfiche card bearing images, end members joined one at each end of said bar and extending in one direction from said bar, said end members having terminal portions disposed below the plane of said bar and adapted to be guided by the edges of a glass plate on a reader or reader-printer, and
   a thin ribbon of opaque material secured to said terminal portions and extending generally parallel to said bar for masking selected portions of a projected image.

2. An image masking device according to claim 1 wherein a pair of glide members are formed on the lower surfaces of said end members to locate the bar on the top of a said glass plate and said ribbon is spaced from said glide members to be positioned below a said glass plate.

3. An image masking device according to claim 1 wherein said ribbon is a thin band of stainless steel.

4. An image masking device according to claim 3 wherein said band has a thickness of about 0.001 inch.

5. An image masking device according to claim 2 wherein said ribbon is sufficiently thin to afford sharp demarcation between projection image portions and obscured portions.

* * * * *

UNITED STATES PATENT AND TRADEMARK OFFICE
CERTIFICATE OF CORRECTION

PATENT NO. : 4,688,911

DATED : August 25, 1987

INVENTOR(S) : John J. Simbal

It is certified that error appears in the above-identified patent and that said Letters Patent is hereby corrected as shown below:

Claim 4 (column 4, line 35), "0.001" should read -- 0.002 --.

Signed and Sealed this

Second Day of February, 1988

Attest:

DONALD J. QUIGG

*Attesting Officer*  *Commissioner of Patents and Trademarks*